(12) United States Patent
Nakamura et al.

(10) Patent No.: US 7,959,302 B2
(45) Date of Patent: Jun. 14, 2011

(54) DISPLAY DEVICE AND GAME MACHINE

(75) Inventors: Norio Nakamura, Matsumoto (JP);
Toshiyuki Hosaka, Matsumoto (JP);
Toru Kurihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1118 days.

(21) Appl. No.: 11/689,914

(22) Filed: Mar. 22, 2007

(65) Prior Publication Data
US 2007/0285585 A1 Dec. 13, 2007

(30) Foreign Application Priority Data
Mar. 28, 2006 (JP) .................................. 2006-088302

(51) Int. Cl.
*G03B 21/14* (2006.01)
(52) U.S. Cl. ............................ 353/74; 353/79; 359/446
(58) Field of Classification Search ............... 359/197.1, 359/205.1, 208.1, 208.2, 201.2, 202.1, 204.1, 359/204.4, 446, 449, 458; 353/77, 78, 79, 353/98, 99, 94
See application file for complete search history.

(56) References Cited

U.S. PATENT DOCUMENTS

| 5,159,362 | A * | 10/1992 | Monroe et al. .................. 352/85 |
| 5,742,358 | A * | 4/1998 | Iijima et al. .................... 348/789 |
| 6,764,183 | B2 * | 7/2004 | Okazaki .......................... 353/31 |
| 6,798,575 | B2 * | 9/2004 | Kobayashi ..................... 359/618 |
| 6,986,581 | B2 * | 1/2006 | Sun et al. ........................ 353/31 |
| 7,142,257 | B2 * | 11/2006 | Callison et al. ............... 348/744 |
| 7,377,656 | B2 * | 5/2008 | Nojima et al. .................. 353/77 |
| 7,384,158 | B2 * | 6/2008 | Ramachandran et al. ...... 353/70 |
| 7,416,306 | B2 * | 8/2008 | Yamamoto et al. ............. 353/31 |
| 7,448,756 | B2 * | 11/2008 | Cho et al. ........................ 353/37 |
| 2003/0011751 | A1 | 1/2003 | Sakata et al. |
| 2004/0169827 | A1 | 9/2004 | Kubo et al. |
| 2007/0010318 | A1 * | 1/2007 | Rigsby et al. .................. 463/20 |

FOREIGN PATENT DOCUMENTS

| JP | A 7-067074 | 3/1995 |
| JP | A 2001-281583 | 10/2001 |
| JP | A 2003-021800 | 1/2003 |
| JP | A 2003-126461 | 5/2003 |
| JP | A 2004-282711 | 10/2004 |
| JP | A 2005-095518 | 4/2005 |
| WO | WO 93/15434 | 8/1993 |

* cited by examiner

*Primary Examiner* — William C Dowling
(74) *Attorney, Agent, or Firm* — Oliff & Berridge PLC (57) ABSTRACT

The invention has an object of providing a display device, which can freely change a display position or a display area, and can display a high grade image, and a game machine, such as a slot machine etc., which includes the display device.

9 Claims, 10 Drawing Sheets

DISPLAY DEVICE AND GAME MACHINE

TECHNICAL FIELD

The present invention relates to a display device which can carry out a variety of displays, and a game machine, such as a slot machine etc., which includes the display device.

BACKGROUND ART

In a pachinko game machine or a slot machine, it is known that a display portion relating to an implementation of a game is configured of a projector or the like (for example, refer to Patent Document 1).

[Patent Document 1] JP-A-2005-95518

DISCLOSURE OF THE INVENTION

Problems that the Invention is to Solve

However, in the display portion configured of the projector, although it is comparatively easy to adjust a screen size, it is difficult to change an aspect ratio, so there is a negative effect in which a loss occurs as a non-displayed area is formed due to adjusting a balance in the aspect ratio, or an image quality deteriorates significantly in the event that a resolution of a unique panel does not conform with a resolution of a signal.

Therefore, the invention has an object of providing a display device which can freely change a display position or a display area, and can display a high grade image, and a game machine, such as a slot machine etc., which includes the display device.

Means for Solving the Problems

In order to solve the heretofore described problem, a display device according to the invention includes: (a) an image display screen; (b) a light source device which emits a modulated luminous flux as an approximately parallel light; (c) an optical scanner which causes the luminous flux from the light source device to scan over the screen; (d) a synchronous drive unit which synchronously drives the light source device and the optical scanner; and (e) a display control device which, by controlling an operation of the synchronous drive unit, causes it to carry out a display of an image on the screen.

In the heretofore described display device, since the optical scanner causes the luminous flux from the light source device to scan over the screen as a pixel spot for example, it being possible to depict an optional image with a high grade on the screen, by means of this kind of image, it is possible to carry out a variety of displays. In this way, in a case of carrying out a drawing on the screen by the optical scanner causing the luminous flux to scan, it being possible to freely change a display position or a display area of the image including a disposition and the like of the screen, it is possible to heighten a diversification of expressions.

In a specific aspect of the invention, the light source device includes a light source having a laser or a light emitting diode, and a collimating optical element having a lens or a mirror which parallelizes a luminous flux from the light source. In this case, as it is possible to reliably radiate a small diameter luminous flux onto the screen regardless of a distance from the light source device, it is possible to form a high grade image on the screen by means of a high precision drawing.

In another aspect of the invention, the display device further includes: one or more intervening mirrors which guide the luminous flux emitted from the optical scanner onto the screen. In this case, it being possible to heighten a degree of freedom of a path from the optical scanner to the screen, it is possible to heighten a degree of freedom of a disposition of the light source device or the optical scanner with respect to the screen.

In still another aspect of the invention, the intervening mirrors have an aspherical reflecting surface. In this case, by an adjustment in shape of the reflecting surface, it is possible to adjust a drawing position and the like in each portion on the screen.

In still another aspect of the invention, the screen, being installed in such a way as to be movable, further includes a disposition changing device which moves the screen as necessary. In this case, it being possible to move the screen and carry out a display, it is possible to increase a diversification of effects by a change in the display position or the like.

In still another aspect of the invention, the screen has a three-dimensional uneven shape. In this case, a three-dimensional drawing becoming possible on the stereoscopic screen, it is possible to express an image rich in unpredictability, vitality and the like.

In still another aspect of the invention, the screen, being formed in such a way as to be transformable, further includes a shape changing device which transforms the screen as necessary. In this case, it being possible to change the shape of the screen in accordance with a timing of an implementation of a game, a varied image display becomes possible.

In still another aspect of the invention, the display device includes a plurality of direct drawing projector main bodies which each have the light source device, the optical scanner and the synchronous drive unit. The plurality of direct drawing projector main bodies each project image lights onto the screen from different directions. In this case, it is possible to draw on each portion of the screen with an appropriate luminance in such a way that it is not shadowed.

In still another aspect of the invention, the screen includes a phosphor which exhibits luminescence by means of the luminous flux emitted from the light source device. In this case, it becomes possible to express a color corresponding to a wavelength differing from that of the luminous flux emitted from the light source device.

Also, a game machine of the invention includes the image display device.

Herein, as the game machine, it is possible to exemplify a pachinko machine, a slot machine, a pinball machine, an arrange ball machine and the like.

In still another aspect of the invention, the game machine further includes: a plurality of rotating drum reels each having patterns formed on a side surface; and a rotation drive device which rotates the plurality of rotating drum reels. The screen is disposed in a prescribed place on a periphery of the plurality of rotating drum reels. In this case, it being possible to provide a display, which assists in a visual effect of the game by the slot machine, on the periphery of the rotating drum reels, it is possible to heighten an interest in the game.

BEST MODE FOR CARRYING OUT THE INVENTION

First Embodiment

Figure 1:
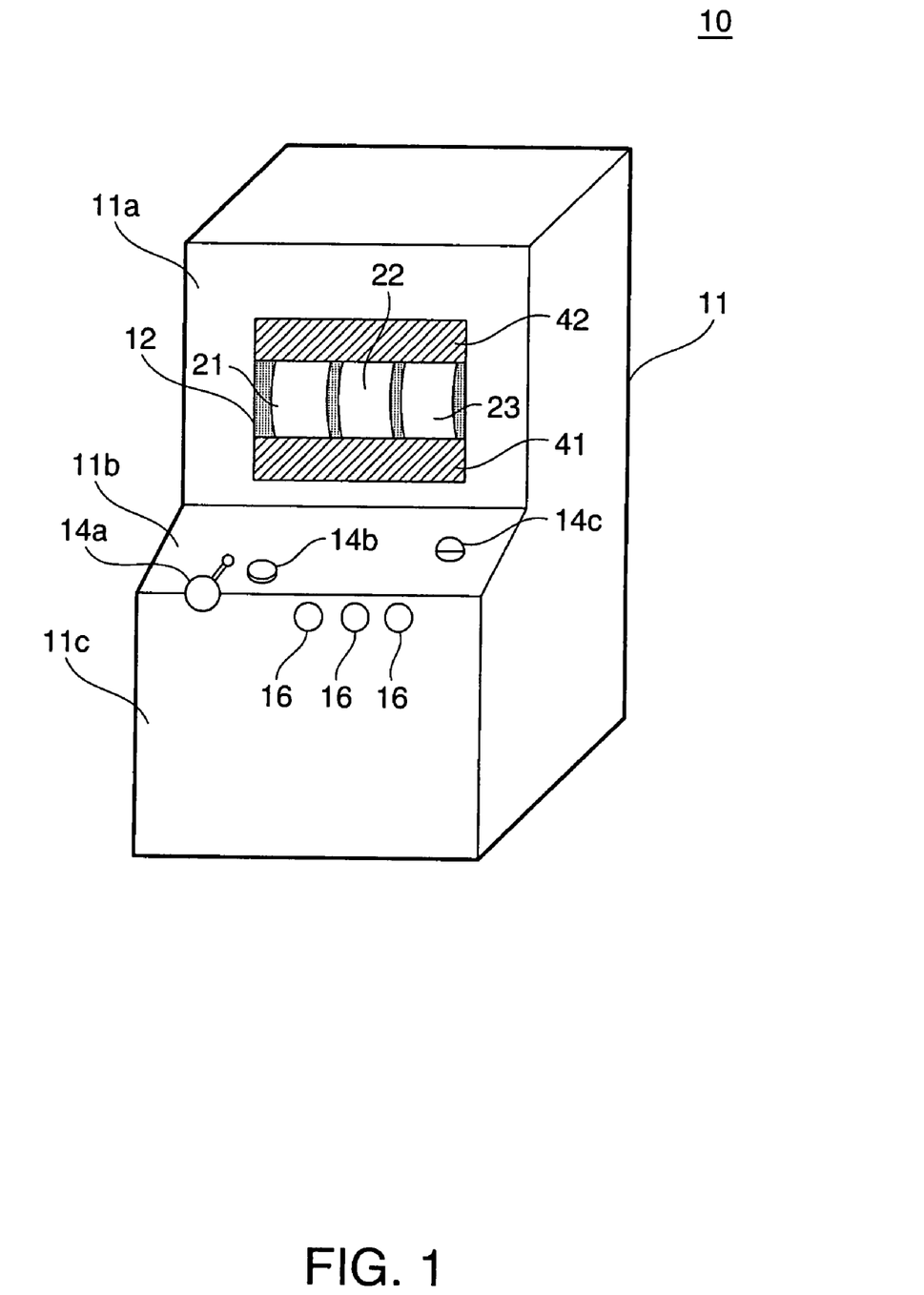
FIG. 1 A perspective view showing a slot machine according to a first embodiment of the invention.

FIG. 1 is a perspective view showing an external appearance of a slot machine which is a first embodiment of a rotating drum type game machine according to the invention. The slot machine 10, being housed in a box-like casing 11, has a display window 12 in a center of a panel surface 11a in an upper portion of the casing 11, and has a start lever 14a, a bet button 14b and a coin insertion slot 14c on an operation table 11b in a central portion of the casing 11. Also, it has three stop buttons 16 in an upper portion of a panel surface 11c in a lower portion of the casing 11.

In the heretofore described slot machine 10, it is possible to observe patterns formed on side surfaces of three rotating drum reels 21, 22 and 23 through the display window 12. A first and a second advanceable and retractable screen portion 41 and 42 are provided respectively in a lower portion and an upper portion of the display window 12. As will be described in detail hereafter, an image from a direct drawing projector main body incorporated inside the casing 11 is projected onto the screen portions 41 and 42.

The rotating drum reels 21, 22 and 23 start their individual rotations in a case in which, there being a coin insertion from the coin insertion slot 14c, the bet button 14b is pushed and the start lever 14a is operated by a player. Then, when each stop button 16 is pushed by the player, the rotation of a corresponding one of the rotating drum reels 21, 22 and 23 stops. In a condition in which the rotation of all the rotating drum reels 21, 22 and 23 stops, in the event that patterns displayed on the side surfaces thereof are an arrangement of a specified combination, they constitute a winning combination, and a corresponding coin payout is carried out. At this time, in accordance with a progress of a game, the screen portions 41 and 42 emerge into the display window 12, and a display corresponding to an implementation of the game, that is, each kind of display, including a winning effect, a warning effect, a predictive effect and the like, is carried out on the screen portions 41 and 42. A specific display in the screen portions 41 and 42 includes, for example, displaying that there is a chance to win in the event that a specified symbol such as a cherry appears.

Figure 2:
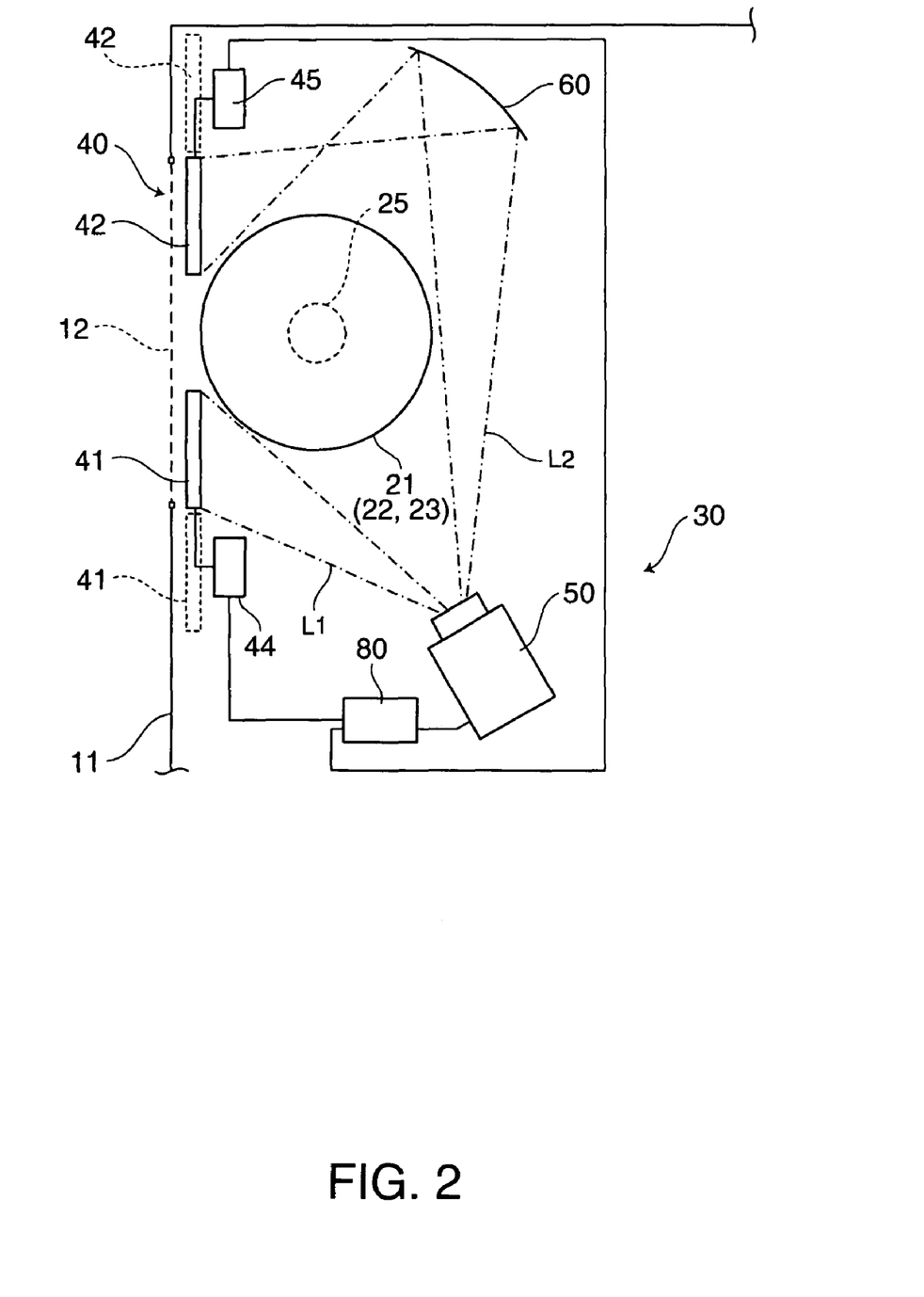
FIG. 2 A sectional side view of the slot machine in FIG. 1.

FIG. 2 is a sectional side view illustrating a structure of a display device in the slot machine 10. The rotating drum reels 21, 22 and 23, being disposed in front of the display window 12, are each driven to rotate individually around a horizontal axis by a motor 25, which is a rotation drive unit.

A display device 30 is disposed on a periphery of the rotating drum reels 21, 22 and 23. The display device 30, being a direct drawing projector, includes a screen device 40, a projector main body 50, a light guiding optical system 60 and a display control device 80. A drawing luminous flux L1, among luminous fluxes emitted from the projector main body 50, which is emitted to a lower side of the rotating drum reels 21, 22 and 23, falls incident directly on the first screen portion 41, and is caused to scan over the first screen portion 41. Also, a drawing luminous flux L2, among the luminous fluxes emitted from the projector main body 50, which is emitted to an upper side of the rotating drum reels 21, 22 and 23, falls incident on the second screen portion 42 via the light guiding optical system 60, and is caused to scan over the second screen portion 42.

In the above display device 30, the screen device 40 includes the first and second screen portions 41 and 42 which are stereoscopic, and a first and a second lifting and lowering device 44 and 45 for causing an advancement and retraction operation of both respective screen portions 41 and 42. Herein, both lifting and lowering devices 44 and 45 function as disposition changing devices which move the screen portions 41 and 42 as necessary.

Figure 3A:
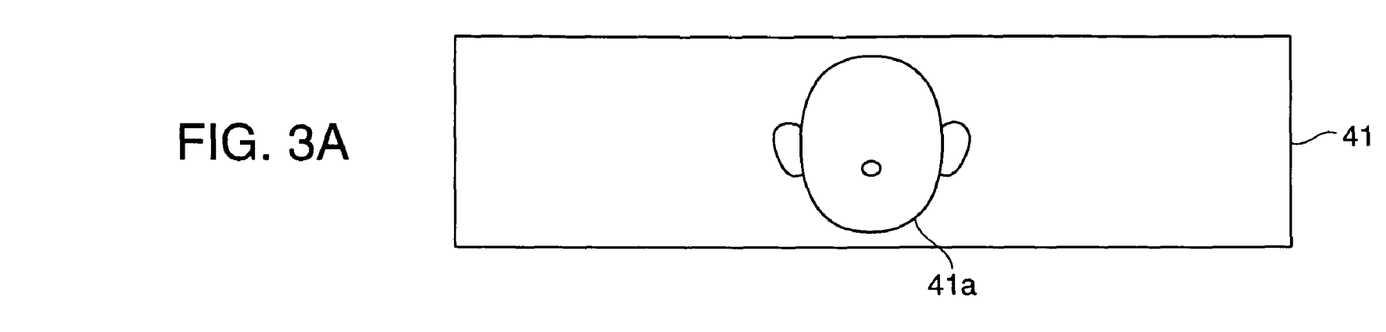
Figure 3B:
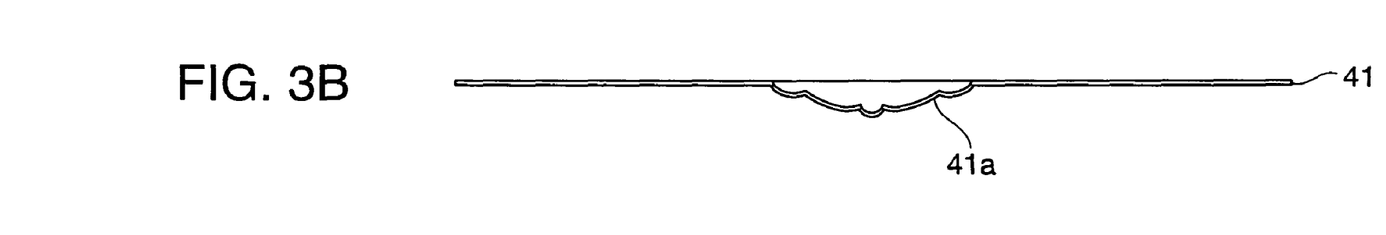
Figure 3C:
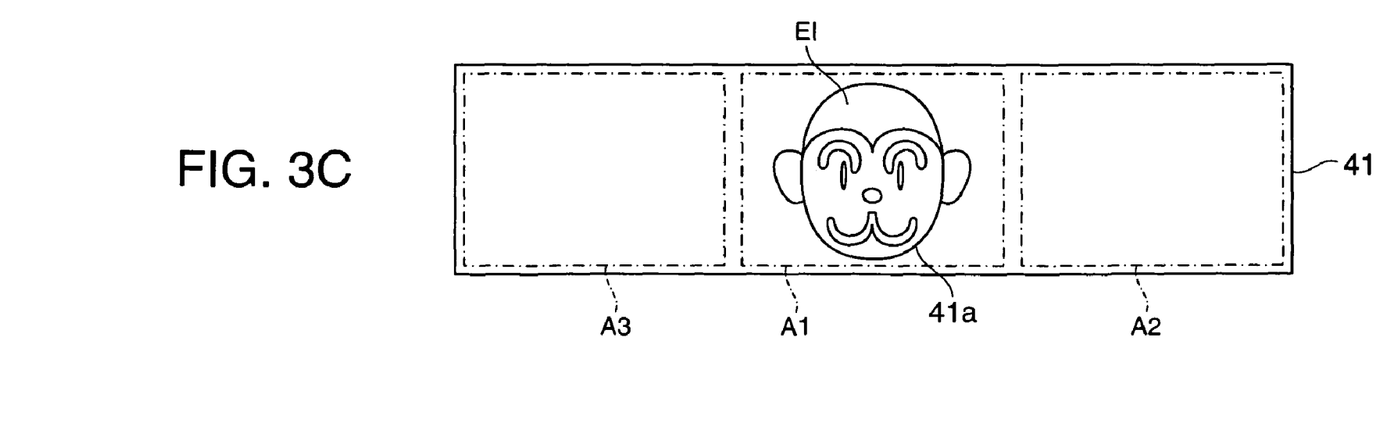

FIGS. 3(a) and 3(b) are a front view and a plan view of the first screen portion 41. A stereoscopic portion 41a, being provided in a center of the first screen portion 41, is comparatively flat, but has a three-dimensional uneven shape which protrudes on a front side. In this case, although an example has been shown in which the stereoscopic portion 41a protrudes on the front side, it is acceptable that it is a recessed portion which protrudes backward, and it is also acceptable that it is an uneven portion which protrudes forward and backward. The drawing luminous flux L1 emitted from the projector main body 50 of FIG. 2 falls incident on the first screen portion 41. The drawing luminous flux L1 is caused to scan over the first screen portion 41 including the stereoscopic portion 41a. The stereoscopic portion 41a can be designed to simulate, for example, a facial protrusion, and, by the drawing luminous flux L1 scanning, it is possible to draw an expression EI thereon as a stereoscopic image which changes correlated with, for example, the winning effect, the warning effect, the predictive effect or the like (refer to FIG. 3(c)). Although the above description has been given on the premise of drawing in a whole of the first screen portion 41, in the projector main body 50, as it is possible to set a drawing range by the drawing luminous flux L1 with a great degree of freedom, for example, it is possible to carry out the drawing in one of first to third areas A1 to A3 shown in FIG. 3(c), or it is possible to carry out the drawing by switching between the areas A1 to A3.

Returning to FIG. 2, the second screen portion 42 also having the same structure as the first screen portion 41, by means of the drawing luminous flux L2 emitted parallel to the drawing luminous flux L1 from the projector main body 50, the stereoscopic image or the like which changes correlated with the winning effect, the warning effect, the predictive effect or the like can be displayed in a proper place within the second screen portion 42.

The first lifting and lowering device 44, being able to lift and lower the first screen portion 41 under a control of the display control device 80, can advance and retract the first screen portion 41 between an operation position (full line), in which the first screen portion 41 is lifted and exposed to the lower portion of the display window 12, and a retraction position (dotted line), in which the first screen portion 41 is lowered and retracted below the display window 12. That is, the first lifting and lowering device 44, in a case of preventing the display from being carried out on the first screen portion 41, as well as moving the first screen portion 41 to the retraction position so as to hide it from view, in a case of allowing the display to be carried out on the first screen portion 41, moves the first screen portion 41 to the operation position, enabling the first screen portion 41 to be observed on the lower side of the rotating drum reels 21, 22 and 23 through the display window 12.

The second lifting and lowering device 45, also being able to lift and lower the second screen portion 42 under the control of the display control device 80, can advance and retract the second screen portion 42 between an operation position (full line), in which the second screen portion 42 is lowered and exposed to the upper portion of the display window 12, and a retraction position (dotted line), in which the second screen portion 42 is lifted and retracted above the display window 12. That is, the second lifting and lowering device 45, in a case of preventing the display from being carried out on the second screen portion 42, as well as moving the second screen portion 42 to the retraction position so as to hide it from view, in a case of allowing the display to be carried out on the second screen portion 42, moves the second screen portion 42 to the operation position, enabling the second screen portion 42 to be observed through the display window 12.

The projector main body 50, being disposed below the rotating drum reels 21, 22 and 23, emits the drawing luminous fluxes L1 and L2 directly or indirectly onto the screen portions 41 and 42.

Figure 4:
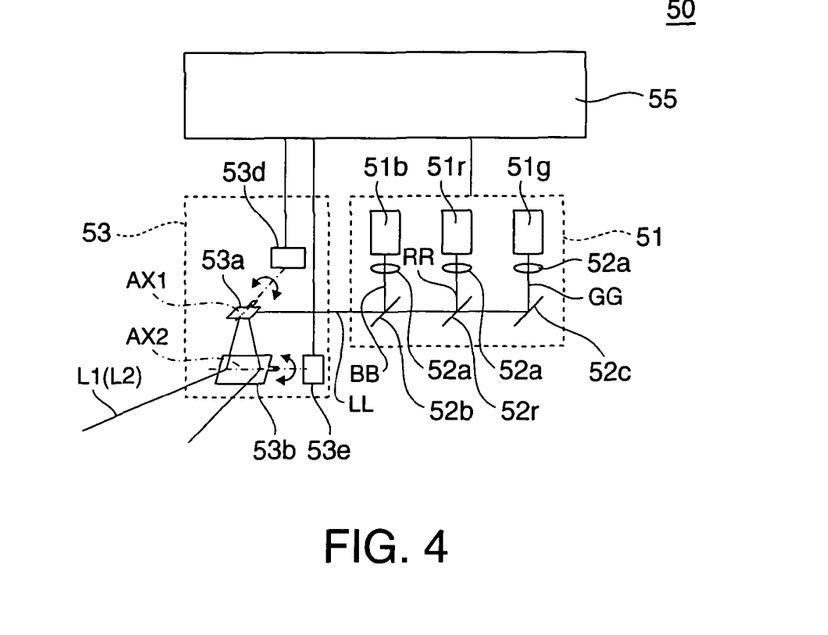
FIG. 4 A block diagram conceptually illustrating a structure of a projector main body.

FIG. 4 is a block diagram conceptually illustrating a structure of the projector main body 50. The projector main body 50 includes a light source device 51, which emits a modulated small diameter luminous flux as an approximately parallel beam, an optical scanner 53, which causes the luminous flux from the light source device 51 to scan, and a drive unit 55, which operates the light source device 51 and the optical scanner 53 in accordance with an input signal.

The light source device 51 includes color laser sources 51r, 51g and 51b, collimator lenses 52a, a mirror 52c and dichroic mirrors 52r and 52b. The color laser sources 51r, 51g and 51b emit a red laser beam RR, a green laser beam GG and a blue laser beam BB respectively. The color laser beams RR, GG and BB are emitted modulated in response to a drive signal transmitted from the drive unit 55, parallelized by the collimator lenses 52a which are collimating optical elements, and turned into thin beams. The dichroic mirrors 52r and 52b have characteristics of reflecting the red laser beam RR and the blue laser beam BB respectively, whereby the color laser beams RR, GG and BB are integrated, causing one laser beam LL to emerge.

In the heretofore described light source device 51, it is possible to use collimator mirrors in place of the collimator lenses 52a and, in this case too, it is possible to form thin beams of parallel luminous fluxes. Also, in a case in which the parallel luminous fluxes are emitted from the color laser sources 51r, 51g and 51b, the collimator lenses 52a can be omitted. Furthermore, with regard to the laser sources 51r, 51g and 51b, it is possible to replace them with light sources such as light emitting diodes which generate the similar luminous fluxes.

The optical scanner 53 includes mirrors 53a and 53b, and actuators 53d and 53e. The mirror 53a is rotatable around a rotation axis AX1, while the mirror 53b is rotatable around a rotation axis AX2. The actuator 53d, operating in accordance with a drive signal from the drive unit 55, rotates the mirror 53a around the rotation axis AX1 as appropriate, while the actuator 53e, operating in accordance with the drive signal from the drive unit 55, rotates the mirror 53b around the rotation axis AX2 as appropriate. That is, by the rotation of the mirror 53a, a main scanning along a direction perpendicular to the rotation axis AX1 becomes possible while, by the rotation of the mirror 53b, a sub-scanning along a direction perpendicular to the rotation axis AX2 becomes possible. As a result, the laser beam LL passing through the mirrors 53a and 53b becomes able to scan two-dimensionally over a desired area as the drawing luminous fluxes L1 and L2, enabling a direct drawing in optical positions on the screen portions 41 and 42. As the optical scanner 53, it is possible to use, for example, an MEMS (Micro Electro Mechanical Systems) element in which an actuator is formed integrally on a biaxial galvano mirror or a semiconductor substrate by a thin film manufacturing process.

The drive unit 55, being a synchronous drive unit, converts a drive signal transmitted from a not-shown control device into an electrical signal, and synchronously operates the light source device 51 and the optical scanner 53 in response to the relevant signal. At this time, the operation of the light source device 51 and the optical scanner 53 is controlled by the drive unit 55 so as to carry out an adjustment of an intensity, a projection position, a radiation timing and the like of the laser beam LL.

Figure 5:
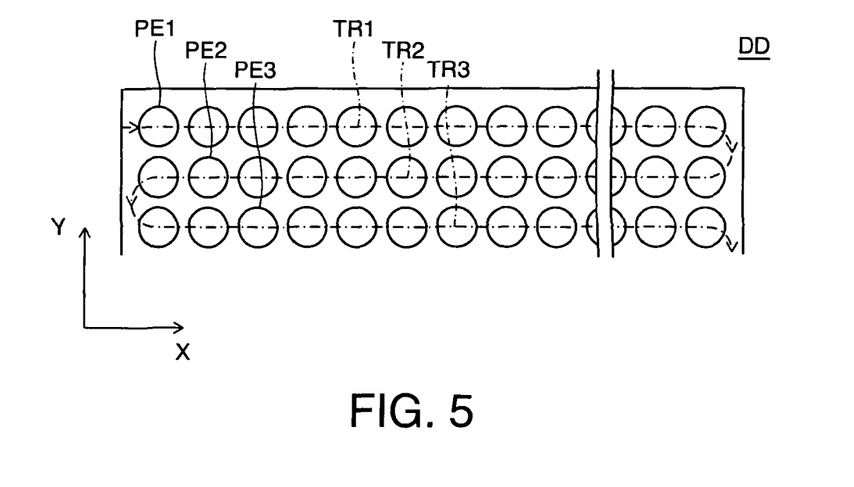
FIG. 5 A view for illustrating an image formation by the projector main body in FIG. 3.

FIG. 5, being a view for illustrating an image formation by the projector main body 50 shown in FIG. 4, schematically shows a projected image in the screen portion 41.

The drawing luminous flux L1 (refer to FIG. 4) emitted from the projector main body 50 is first caused to scan along a trajectory TR1 in an X direction positive orientation from a topmost line left edge of a projection area DD. At this time, an output of the laser sources 51r, 51g and 51b in FIG. 4 is controlled, and pixels PE1 arranged in the X direction are illuminated with a necessary luminance by the spot-like drawing luminous flux L1. Next, the drawing luminous flux L1, having reached a right edge of the projection area DD, makes one pixel's worth of shift in a Y direction negative orientation, and is caused to scan along a trajectory TR2 in an X direction negative orientation. At this time, the output of the laser sources 51r, 51g and 51b in FIG. 4 is controlled, and pixels PE2 arranged in the X direction are illuminated with a necessary luminance by the spot-like drawing luminous flux L1. Again, the drawing luminous flux L1, having reached the right edge of the projection area DD, makes one pixel's worth of shift in a Y direction negative orientation, and is caused to scan along a trajectory TR3 in the X direction positive orientation. At this time, the output of the laser sources 51r, 51g and 51b in FIG. 4 is controlled, and pixels PE3 arranged in the X direction are illuminated with a necessary luminance by the spot-like drawing luminous flux L1. Hereafter, by repeating this operation, the drawing luminous flux L1 is caused to scan in a whole of the projection area DD.

Although the above is a description of a drawing in a planar portion, in the stereoscopic portion 41a too, the similar drawing is possible. However, with regard to the stereoscopic portion 41a, as the pixels PE1, PE2, . . . shown in FIG. 5 are projected onto a curved surface, it is necessary to project an image with a distortion corrected in advance. For this reason, the display control device 80, to be described hereafter, is provided with an image processing circuit or a storage device, causing it to carry out a high-speed calculation process or a storage of a large amount of images. Accordingly, as a projection distortion can be eliminated in advance by an image processing such as a coordinate transformation, or an image with the projection distortion canceled out by the stereoscopic portion 41a can be stored in advance, it is possible to project an image with no distortion onto the stereoscopic portion 41a.

Returning to FIG. 2, the light guiding optical system 60, being an intervening mirror disposed on an optical path of the drawing luminous flux L2, reflects the drawing luminous flux L2 emitted from the projector main body 50 in an appropriate direction, enabling a one-to-one mapping projection corresponding to an incidence position in such a way that the drawing luminous flux L2 fits in the screen portion 41. Herein, the light guiding optical system 60, being able to be formed in not only a mere spherical surface but a curved surface of an optional shape (an aspherical surface), is configured in such a way that the luminous flux emitted from the projector main body 50 falls incident on the projection area of the second screen portion 42. At this time, as the luminous fluxes emitted from the projector main body 50 are very thin beams, it is possible to make an image drawn in the second screen portion 42 have no blur or distortion.

Figure 6:
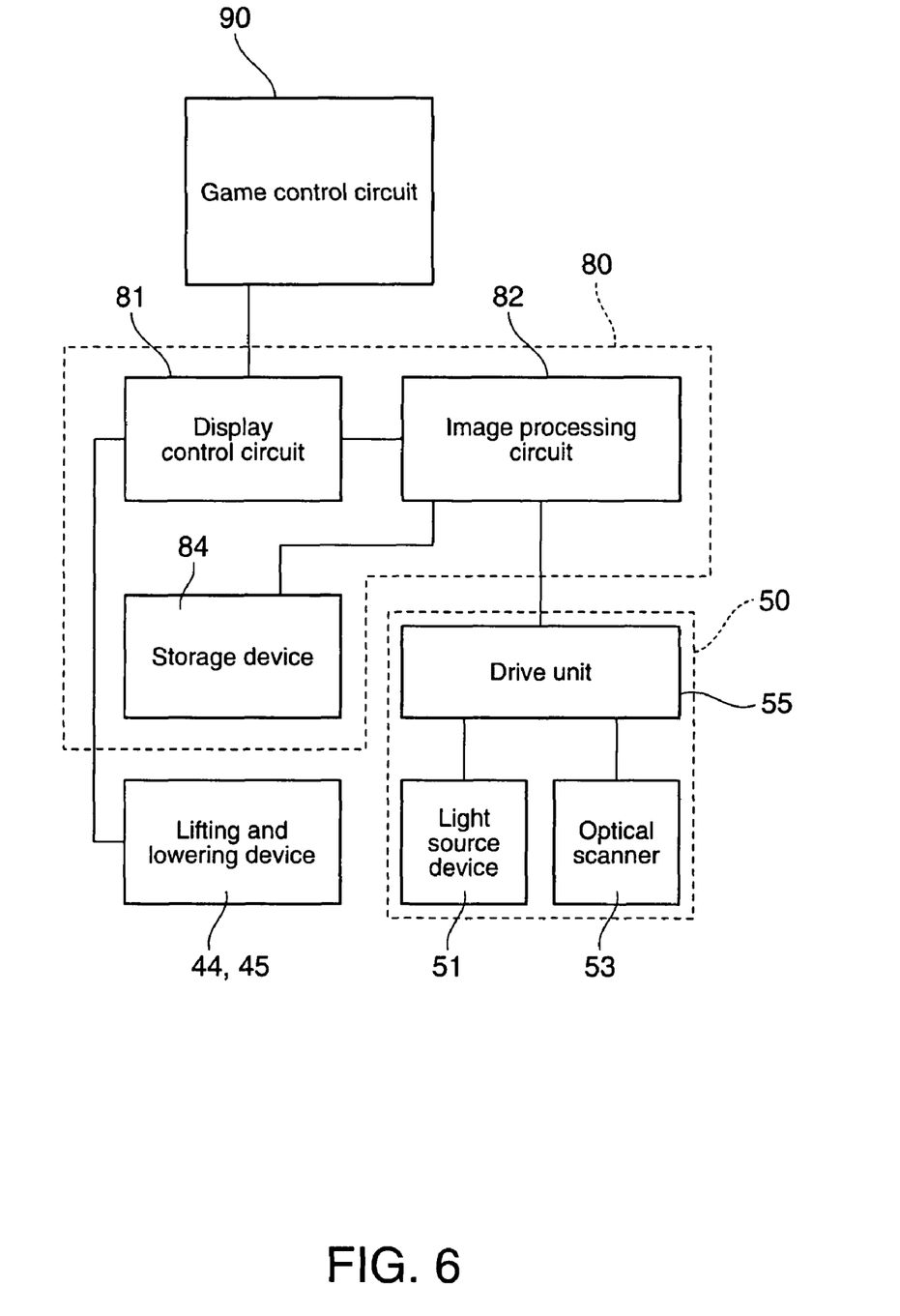
FIG. 6 A block diagram illustrating a display control circuit which operates the projector main body.

FIG. 6 is a block diagram conceptually illustrating the display control device 80 for operating the projector main body 50 and the lifting and lowering devices 44 and 45. The display control device 80, being a circuit device which operates based on a control signal from a game control circuit 90 or display data, includes a display control circuit 81, an image processing circuit 82 and a storage device 84. The display control circuit 81, based on the control signal from the game control circuit 90, controls an overall operation of the display device including the display control device 80 and the projector main body 50. Specifically, it designates an operation timing of the projector main body 50 or display details and, by controlling the lifting and lowering devices 44 and 45, adjusts the advancement and retraction of the screen portions 41 and 42. The image processing circuit 82, under a control of the display control circuit 81, operates the drive unit 55 as appropriate based on an instruction from the game control circuit, and causes the projector main body 50 to carry out a necessary drawing. The storage device 84 stores a picture, a character and the like as sources of an image to be projected onto the screen portions 41 and 42 by the projector main body 50.

In the slot machine 10 described heretofore, as the optical scanner 53 causes the drawing luminous fluxes L1 and L2 from the light source device 51 to scan over the screen portions 41 and 42, it being possible to depict an optional image with a high grade on the screen portions 41 and 42, by means of this kind of image, it is possible to diversify and give variety to an effect at the time of the implementation of the game. In a case of carrying out the drawing on the screen portions 41 and 42 by the optical scanner 53 causing the drawing luminous fluxes L1 and L2 to scan, it being possible to freely change a display position or a display area of the image including a disposition and the like of the screen portions 41 and 42, it is possible to heighten a diversification of expressions. Furthermore, as it is possible, by carrying out a three-dimensional drawing in the stereoscopic portion 41a too, to display a three-dimensional image, it is possible to make a display effect accompanying the implementation of the game in with unpredictability, vitality and the like.

Second Embodiment

Figure 7:
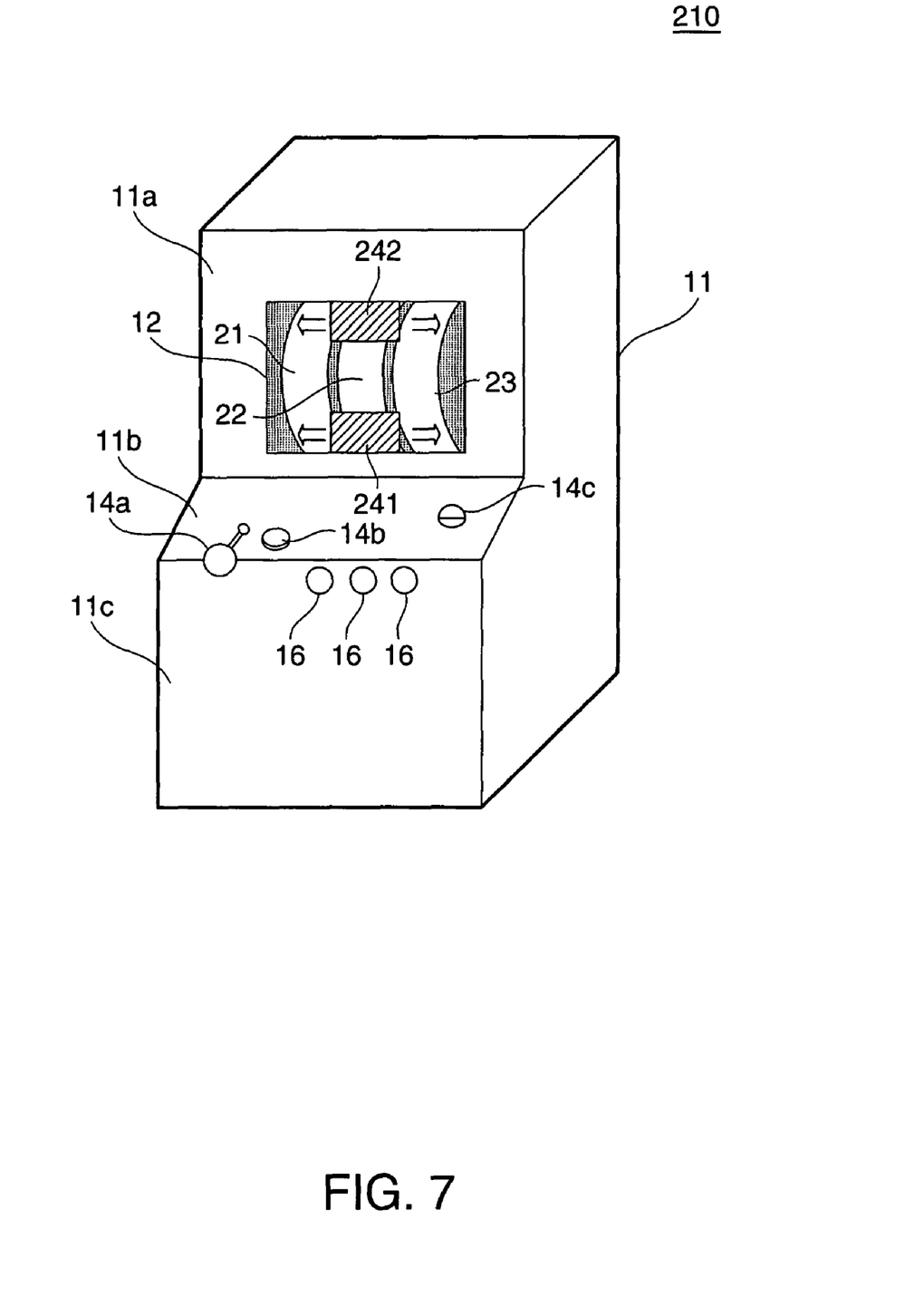
FIG. 7 A perspective view showing a slot machine according to a second embodiment.

FIG. 7 is a perspective view illustrating a slot machine 210 of a second embodiment. The slot machine 210 of the second embodiment is a modified form of the slot machine 10 of the first embodiment, and portions thereof which are not otherwise described are taken to be similar to those of the first embodiment.

In a case of the slot machine 210, a first screen portion 241 is movable right and left in an operation position in the lower portion of the display window 12, and a second screen portion 242 is also movable right and left in an operation position in the upper portion of the display window 12. Both screen portions 241 and 242 are driven by the lifting and lowering devices 44 and 45 of FIG. 2, and operate. Also, the drawing luminous fluxes L1 and L2 from the projector main body 50 of FIG. 2 fall incident on, and are caused to scan over, both screen portions 241 and 242.

In the case of the slot machine 210 of this embodiment, it being possible to project the image onto the moving screen portions 241 and 242, it is possible to make the display effect accompanying the implementation of the game varied and rich.

Third Embodiment

Figure 8:
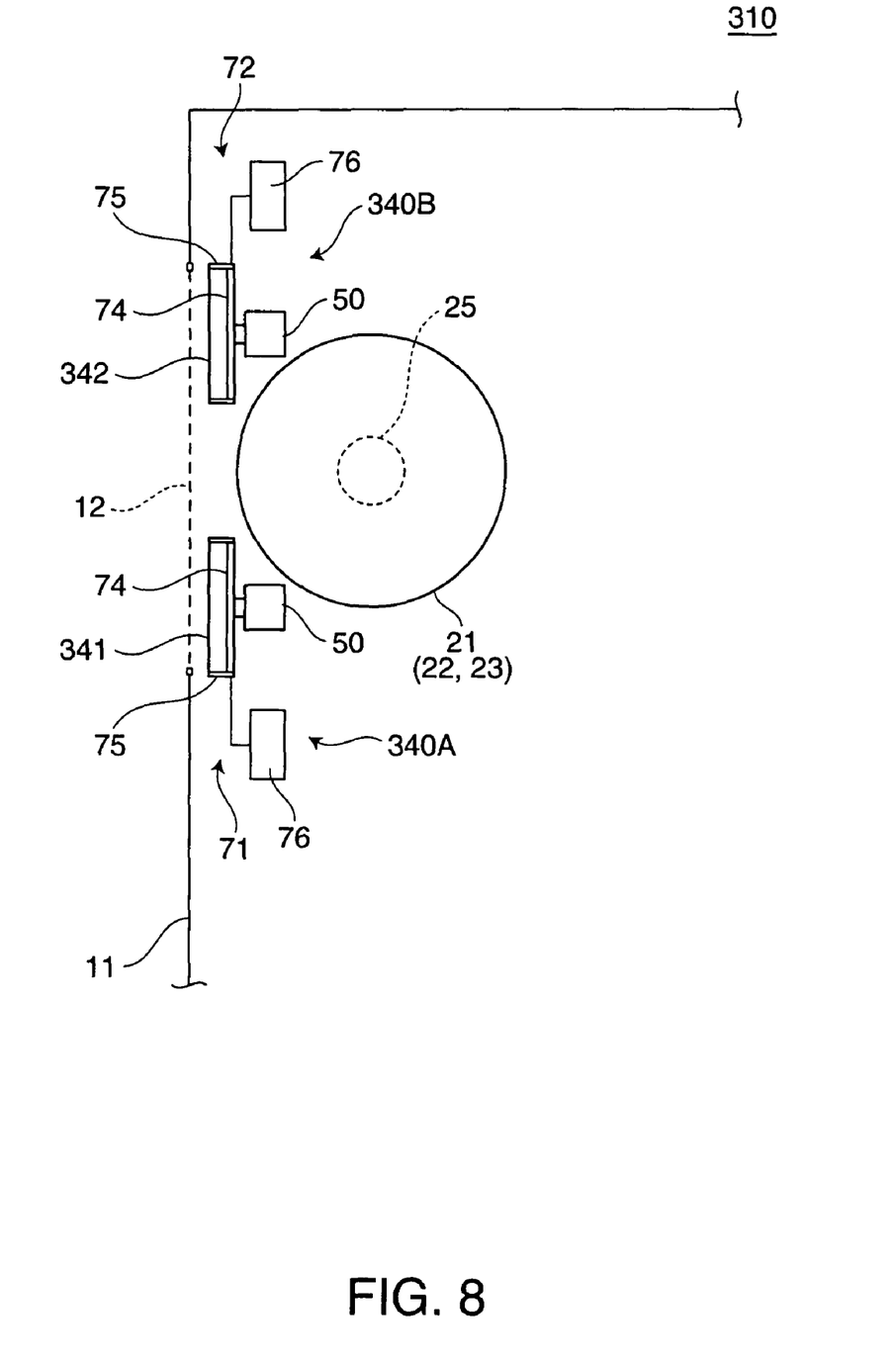
FIG. 8 A sectional side view showing a slot machine according to a third embodiment.

FIG. 8 is a sectional side view illustrating a structure of a slot machine 310 of a third embodiment. The slot machine 310 of the third embodiment is a modified form of the slot machine 10 of the first embodiment, and portions thereof which are not otherwise described are taken to be similar to those of the first embodiment.

In a case of the slot machine 310, although a first and a second screen device 340A and 340B are provided in the upper portion and the lower potion of the display window 12, screen portions 341 and 342 provided in the respective screen devices 340A and 340B, both being formed of a rubber-like material, change in form in response to a pressure. The first and second screen devices 340A and 340B further include a first and a second shape changing device 71 and 72 which transform the respective screen portions 341 and 342 as necessary.

Herein, the first shape changing device 71 includes an air ejector 74 which jets air in a two-dimensional intensity distribution, a support body 75 which supports the first screen portion 341 with respect to the air ejector 74, and a pressurized gas source 76 which supplies the air ejector 74 with pressurized air. In the first shape changing device 71, when the pressurized air from the pressurized gas source 76 is ejected from the air ejector 74, the rubber-like first screen portion 241 changes in form in response to a jet pressure of the pressurized air. At this time, excess pressurized air is expelled to a periphery of the support body 75. In the same way, the second shape changing device 72 also includes an air ejector 74, a support body 75 and a pressurized gas source 76. In the second shape changing device 72, when pressurized air from the pressurized gas source 76 is ejected from the air ejector 74, the rubber-like second screen portion 242 changes in form in response to a jet pressure of the pressurized air. At this time, excess pressurized air is expelled to a periphery of the support body 75.

The projector main body 50, being attached to a center of a back surface of each air ejector 74, causes the drawing luminous flux to fall incident on each screen portion 341 and 342 from behind and scan uniformly thereover.

Figure 9A:
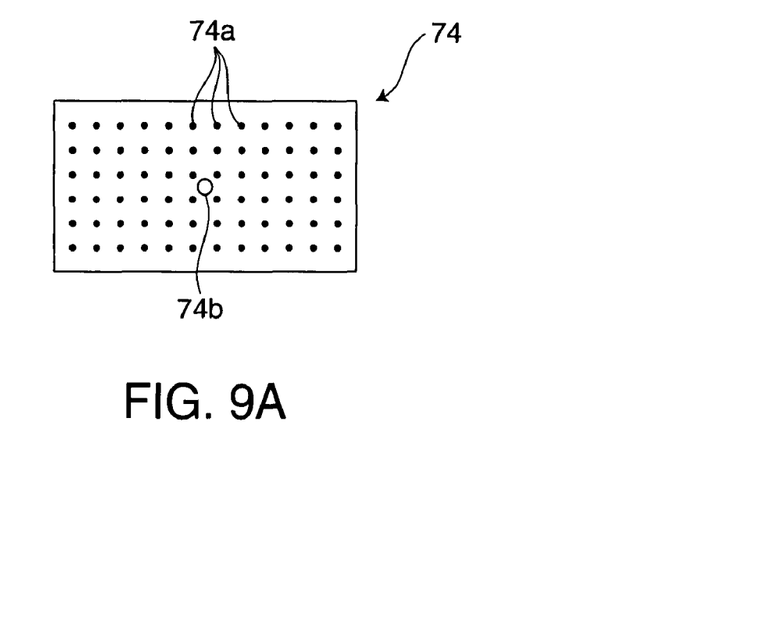
Figure 9B:
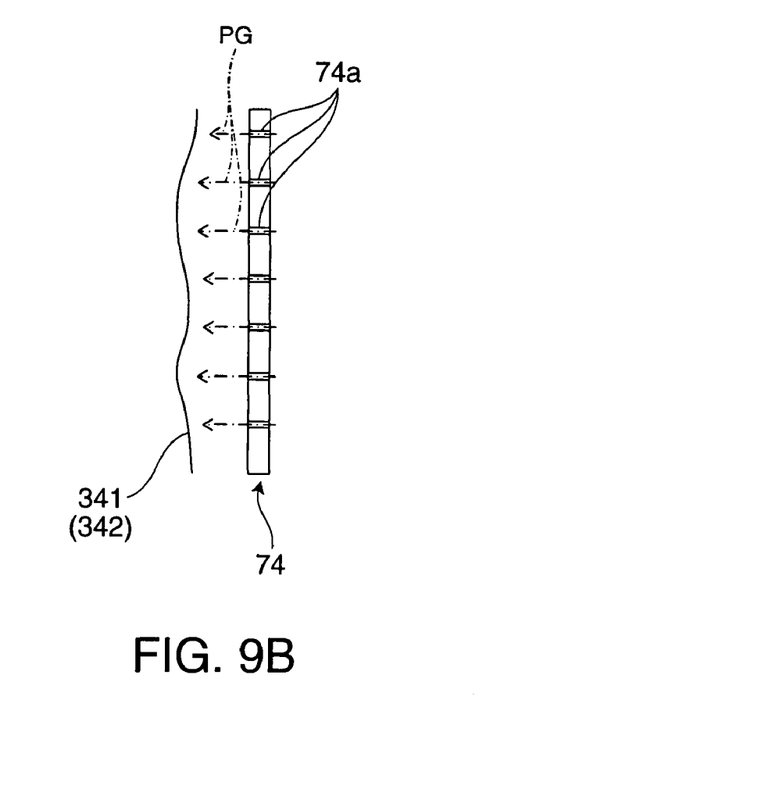

FIG. 9(a) is a plan view illustrating a structure of the air ejector 74, and FIG. 9(b) is a sectional side view illustrating a function of the shape changing device 71. The air ejector 74 includes air ejection openings 74a arranged in a matrix form. A light emergence opening 74b for each projector main body 50 shown in FIG. 8 is formed in a center of the air ejector 74, from which a drawing luminous flux from the projector main body 50 is caused to emerge. In a case of operating the pressurized gas source 76, pressurized airs PG with respective jet pressures adjusted are ejected from the individual air ejection openings 74a. As a result, by transforming the screen portions 341 and 342 disposed in front of the air ejectors 74 into a desired shape, it is possible to obtain a stereoscopic portion 41a having, for example, a kind of shape shown in FIG. 3. Meanwhile, in a case of stopping the operation of the pressurized gas source 76, the screen portions 341 and 342 recover their flatness. The drawing luminous fluxes from the projector main bodies 50 shown in FIG. 8 fall incident on these kinds of screen portions 341 and 342 via the light emergence openings 74b.

Although, in the above description, it has been taken that the shape of the screen portions 341 and 342 in the case of operating the pressurized gas sources 76 is fixed, by adjusting a gas pressure from the pressurized gas sources 76, it is possible to adjust an increase and a decrease in a transformation amount of the screen portions 341 and 342, and by individually controlling the jet pressures from the air ejection openings 74a, it is possible to transform the screen portions 341 and 342 at any time into optional stereoscopic shapes.

Also, by individually forming the air ejection openings 74a configuring each air ejector 74, as well as making them movable individually, it is possible to transform the screen portions 341 and 342 into the optional stereoscopic shapes.

Also, without depending on a disposition of the air ejection openings 74a, by providing the screen portions 341 and 342 in advance with a thickness distribution and so on, it is also possible to configure in such a way that a nonuniform unevenness occurs. In this case, simply by applying a uniform air pressure to a, whole of the screen portions 341 and 342, it is possible to obtain a stereoscopic portion 41a having a desired uneven shape.

Fourth Embodiment

Figure 10:
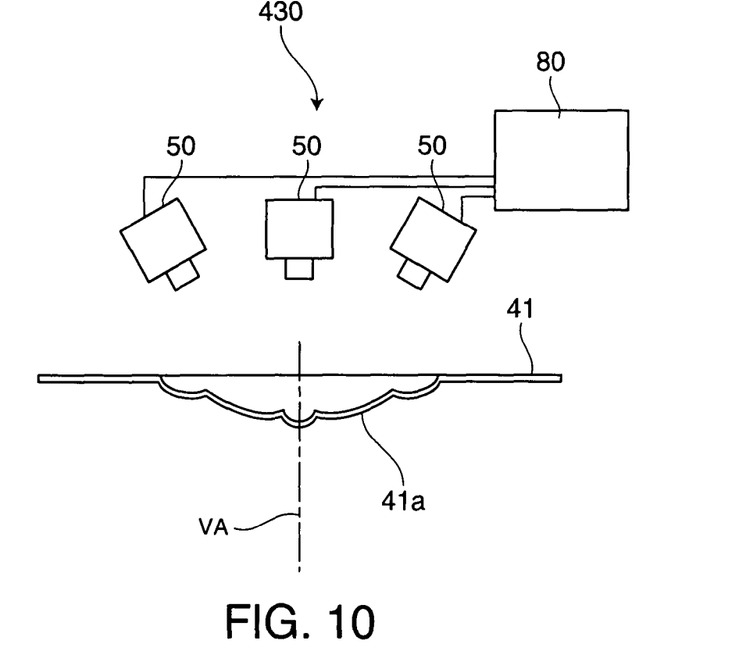
FIG. 10 A view illustrating a display device of a slot machine according to a fourth embodiment.

FIG. 10 is a sectional side view illustrating a structure of a slot machine of a fourth embodiment. The slot machine of the fourth embodiment is a modified form of the slot machine 10 of the first embodiment, and portions thereof which are not otherwise described are made similar to those of the first embodiment.

In this embodiment, a display device 430 is configured of three or more projector main bodies 50. In this case, as the stereoscopic portion 41a of the screen portion 41 can be illuminated in various directions from behind, regardless of the shape of the stereoscopic portion 41a, it is possible to project an image with a sufficient luminance and no shadow. At this time, in accordance with an angle formed by each portion of the stereoscopic portion 41a and a vertical axis VA, by setting assignations of the projector main bodies 50, it being possible to carry out independent drawings, it is possible to project an excellent image onto each portion of the stereoscopic portion 41a.

Fifth Embodiment

Hereafter, a description will be given of a slot machine of a fifth embodiment. The slot machine of the fifth embodiment is a modified form of the slot machine 10 of the first embodiment, and portions thereof which are not otherwise described are made similar to those of the first embodiment.

Figure 11:
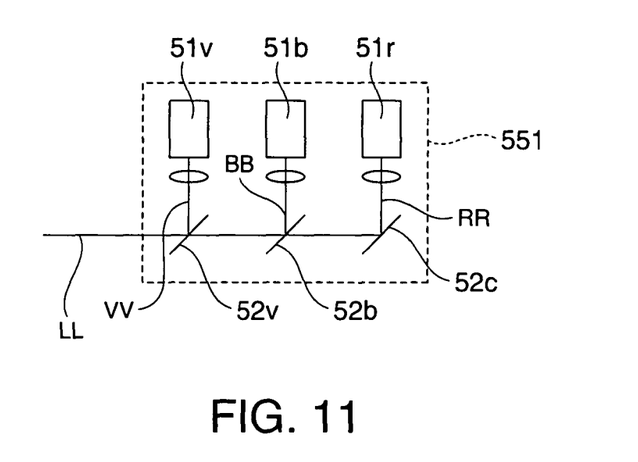
FIG. 11 A view illustrating a main portion of a projector main body according to a fifth embodiment.

As shown in FIG. 11, in this embodiment, a light source device 551 configuring the projector main body 50 includes three laser sources 51r, 51b and 51v, a mirror 52c, and dichroic mirrors 52b and 52v. The color laser sources 51r, 51b and 51v emit a red, a blue and an ultraviolet laser beam RR, BB and VV respectively. The dichroic mirrors 52b and 52v have characteristics of reflecting the blue laser beam BB and the ultraviolet laser beam VV respectively, whereby the color laser beams are integrated, causing one laser beam LL to emerge.

Figure 12:
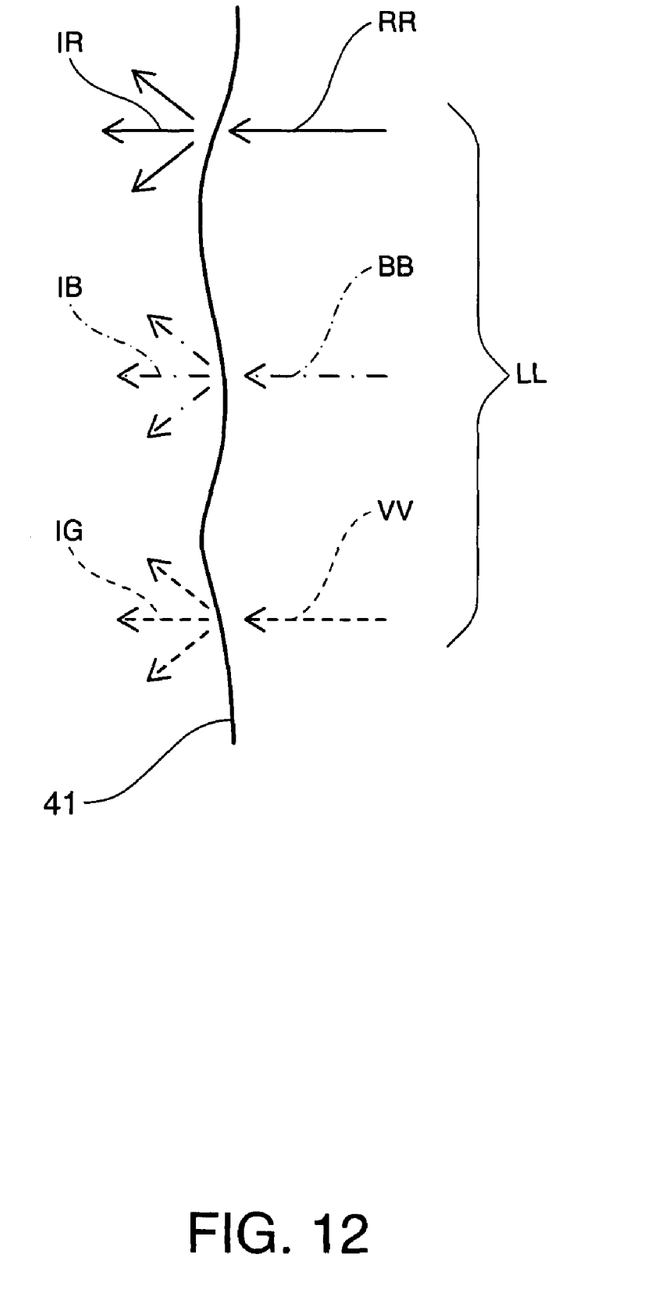
FIG. 12 A view illustrating a drawing by the projector main body in FIG. 11.

FIG. 12 is a side view illustrating the laser beam LL falling incident on the screen portion 41. Although the red and blue laser beams RR and BB in the laser beam LL are only diffused in the screen portion 41, the ultraviolet laser beam VV generates a green fluorescent light due to a phosphor included in the screen portion 41. As a result, it is possible to generate a red, a blue and a green image light IR, IB and IG corresponding to the color laser beams RR, BB and VV.

Of course, by generating the green fluorescent light using not a combination of the ultraviolet laser beam and the phosphor, but a combination of a laser beam of violet or the like and the phosphor, it is possible to achieve the original object.

Although the above description has been given of a case of obtaining the green image light IG from the ultraviolet laser beam VV, it is also possible to obtain the red image light IR or the blue image light IB from the ultraviolet laser beam VV. Furthermore, it is also possible to obtain the color image lights IR, IB and IG individually from a plurality of kinds of ultraviolet laser beam VV. Furthermore, it is possible to provide a filter which cuts the ultraviolet laser beam VV on an emergence surface side of the screen portion 41.

Although the invention has heretofore been described in line with the embodiments, the invention, not being limited to the heretofore described embodiments, can be implemented in various aspects without departing from its scope and, for example, the following modifications are also possible.

That is, although, in the heretofore embodiments, the description has been given of a case in which the heretofore described display device 30 is incorporated into the slot machine acting as the game machine, the invention not being limited to this, it is possible to incorporate the display device 30 into a pachinko machine, a pinball machine, an arrange ball machine and the like which are other game machines. Also, by using an image display screen having a three-dimensional uneven shape, it is also possible to incorporate it into game machines simulating a roulette or card game machine and the like. Also, the image display device of the invention, not being limited to the case in which it is incorporated into the game machines, apart from being able to be used as a stand-alone image display device, may be used as a part of a display of an electronic instrument such as an automatic vending machine or an automatic ticket machine, and may also be applied to an electronic instrument having the image display device. For example, by using the image display screen having the three-dimensional uneven shape, it is also applicable to a globe or a planetarium, as well as a sign, a doll which can display a variety of expressions, or the like. Also, although, in the heretofore described embodiments, the description has been given of a case in which the screen is installed in such a way as to be movable, the invention is not limited to this. It is also acceptable that the screen is installed fixed in a condition in which it does not move.

BRIEF DESCRIPTION OF THE DRAWINGS

FIG. 3 (a) to (c) are views illustrating a screen portion incorporated into the slot machine in FIG. 1;

FIGS. 9 (a) and (b) are views illustrating a mechanism for transforming the screen portion;

DESCRIPTION OF REFERENCE NUMERALS AND SIGNS

10 Slot machine
11 Casing
12 Display window
21, 22, 23 Rotating drum reel
25 Motor
30 Display device
40 Screen device
41 First screen portion
41a Stereoscopic portion
44, 45 Lifting and lowering device
50 Projector main body
51 Light source device
51r, 51g, 51b Laser source
52a Collimator lens 52g, 52b Dichroic mirror
53 Optical scanner
53a, 53b Mirror
53d, 53e Actuator
55 Drive unit
60 Light guiding optical system
71, 72 Shape changing device
80 Display control device
81 Display control circuit
82 Image processing circuit
84 Storage device
90 Game control circuit
BB Blue laser beam
GG Green laser beam
RR Red laser beam
L1, L2 Drawing luminous flux
LL Laser beam

The invention claimed is:

1. A game machine comprising:
 a display device including:
  an image display screen;
  a plurality of rotating drum reels defining a periphery, each of the rotating drum reels having patterns formed on a side surface;
  a rotation drive device which rotates the plurality of rotating drum reels;
  a light source device which emits a modulated luminous flux as an approximately parallel light;
  an optical scanner which causes the luminous flux from the light source device to scan over the screen;
  a synchronous drive unit which synchronously drives the light source device and the optical scanner; and
  a display control device which, by controlling an operation of the synchronous drive unit, causes it to carry out a display of an image on the screen,
 wherein the screen, being installed in such a way as to be movable, further includes a disposition changing device capable of moving a position of the screen, and wherein the screen is disposed in a prescribed place on the periphery of the plurality of rotating drum reels.

2. The game machine according to claim 1, wherein the light source device includes a light source having a laser or a light emitting diode, and a collimating optical element having a lens or a mirror which parallelizes a luminous flux from the light source.

3. The game machine according to claim 1, further comprising: one or more intervening mirrors which guide the luminous flux emitted from the optical scanner onto the screen.

4. The game machine according to claim 3, wherein the intervening mirrors have an aspherical reflecting surface.

5. The game machine according to claim 1, wherein the screen has a three-dimensional uneven shape.

6. The game machine according to claim 1, wherein the screen is made of an elastic material, being formed in such a way as to be transformable, further includes a shape changing device capable of elastically deforming the screen.

7. The game machine according to claim 1, including a plurality of direct drawing projector main bodies which each have the light source device, the optical scanner and the synchronous drive unit, wherein the plurality of direct drawing projector main bodies each project image lights onto the screen from different directions.

8. The game machine according to claim 1, wherein the screen includes a phosphor which exhibits luminescence by means of the luminous flux emitted from the light source device.

9. The game machine according to claim 1, wherein the optical scanner sequentially directs light to each pixel in a projection area of the image display screen,
 the disposition changing device is capable of moving the screen between an operation position and a retraction position, and
 the display control device controls the synchronous drive unit and the disposition changing device.

* * * * *